(12) United States Patent
Moulin

(10) Patent No.: US 6,180,689 B1
(45) Date of Patent: Jan. 30, 2001

(54) FLUID LOSS CONTROL AGENTS AND COMPOSITIONS FOR CEMENTING OIL WELLS COMPRISING SAID FLUID LOSS CONTROL AGENT

(75) Inventor: Eric Moulin, Lyons (FR)

(73) Assignee: Schlumberger Technology Corporation, Sugar Land, TX (US)

( * ) Notice: Under 35 U.S.C. 154(b), the term of this patent shall be extended for 0 days.

(21) Appl. No.: 09/367,363

(22) PCT Filed: Feb. 11, 1998

(86) PCT No.: PCT/EP98/00774

§ 371 Date: Oct. 26, 1999

§ 102(e) Date: Oct. 26, 1999

(87) PCT Pub. No.: WO98/35918

PCT Pub. Date: Aug. 20, 1998

(30) Foreign Application Priority Data

Feb. 12, 1997 (FR) ................................................ 97 01848

(51) Int. Cl.[7] ............................. C09K 7/02; C04B 24/20; C04B 24/26; C08G 63/91; C08L 29/04
(52) U.S. Cl. ................................... 523/130; 524/4; 524/5; 525/57; 525/58; 525/59; 525/60; 525/61
(58) Field of Search .................................... 523/130, 131; 524/4, 5; 525/57, 58, 59, 60, 61

(56) References Cited

U.S. PATENT DOCUMENTS

| | | | | |
|---|---|---|---|---|
| 3,994,852 | * | 11/1976 | Adams et al. | 523/130 |
| 4,590,227 | * | 5/1986 | Nakamura et al. | 523/130 |
| 4,643,255 | * | 2/1987 | Sandiford et al. | 523/130 |
| 4,665,986 | * | 5/1987 | Sandiford | 523/130 |
| 4,665,987 | * | 5/1987 | Sandiford et al. | 523/130 |
| 4,796,700 | * | 1/1989 | Sandiford et al. | 523/130 |
| 4,896,723 | * | 1/1990 | Hoskin et al. | 523/130 |
| 4,940,090 | * | 7/1990 | Hoskin et al. | 523/130 |
| 5,100,952 | * | 3/1992 | Hoskin et al. | 523/130 |
| 5,207,831 | * | 5/1993 | Cowan | 106/724 |
| 5,246,073 | * | 9/1993 | Sandiford et al. | 523/130 |
| 5,298,070 | * | 3/1994 | Cowan | 106/724 |
| 5,594,050 | * | 1/1997 | Audebert et al. | 524/5 |

FOREIGN PATENT DOCUMENTS 155 203 * 12/1981 (JP) ........................................ 525/61

* cited by examiner

Primary Examiner—Peter A. Szekely
(74) Attorney, Agent, or Firm—Robin C. Nava; Gordon G. Waggett

(57) ABSTRACT

The present invention concerns a fluid loss control agent for a petroleum industry (or analogous) cement slurry, comprising a surfactant and a micro-gel obtained by chemical cross-linking of a polyvinyl alcohol. The micro-gel and the surfactant are advantageously compatible with a wide range of petroleum industry cement additives and can also produce compositions which are gas tight.

10 Claims, No Drawings

FLUID LOSS CONTROL AGENTS AND COMPOSITIONS FOR CEMENTING OIL WELLS COMPRISING SAID FLUID LOSS CONTROL AGENT

TECHNICAL FIELD OF THE INVENTION

The present invention concerns the field of petroleum service and supply industries, in particular that of cementing the annulus surrounding the casing in an oil, gas, water, geothermal or analogous well. More precisely, the invention relates to cement slurry formulations which can prevent the passage of gas during the whole cement setting phase.

BACKGROUND

The main aim of cementing an oil (or analogous) well is to isolate the different formation layers traversed by the well to prevent migration between the different geological layers or between the layers and the surface. In particular, it is essential from the point of view of safety to prevent any gas from rising through the annulus between the well wall and the casing.

When the cement has set, it is impermeable to gas. Because of the hydraulic pressure of the height of the cement column, the injected slurry is also perfectly capable of preventing such migration. However, between the two states, there is a critical phase which lasts several hours during which the cement slurry no longer behaves as a liquid but also does not yet behave as an impermeable solid. For this reason, the industry has developed a series of additives which are intended to maintain a gas tight seal during the whole of the cement setting period.

PRIOR ART

Among such (numerous) additives are those which also tend to reduce fluid loss, i.e., prevent dehydration of the petroleum industry fluid when the latter comes into contact with a naturally porous or fissured formation. In general cement slurries with a fluid loss of less than 40 ml over thirty minutes, measured in accordance with API (American Petroleum Institute) standards, are also impermeable to gas, although the correlation between the two phenomena is not systematic, and other parameters such as the almost complete absence of free water formation must also be considered, especially in a non vertical slanted well since the supernatant free water can create a path for the migration of gas. An additive based on a styrene-butadiene latex is the most frequently used additive for preventing gas migration. Such a product is highly effective but relatively expensive and in particular, requires a stabilizer which is known to be toxic and is thus prohibited in certain drilling zones.

Further, a cement slurry comprises in practice a whole series of additives, almost systematically among them an agent which encourages dispersion of the cement particles. The dispersing agents used vary depending on the type of well bored or, more exactly, depending on the temperature to which the cement is subjected. Argillaceous minerals such as bentonite are also frequently used as they can reduce the density of the cement slurry, an essential point when cementing in zones where the formation pressure is low. The question of the compatibility of each new additive with current additives, over a wide range of working temperatures and pressures, is thus fundamental, it being understood that no additive is genuinely universal.

There is thus a need for additives which can render a cement gas tight during setting of the cement, which additives are effective, non toxic and compatible with the majority of additives in current use.

French patent FR-A-2 704 219 describes a novel type of fluid loss control agent for petroleum industry fluids, in particular for cementing slurries. Such fluid loss control agents are constituted by micro-gels obtained by chemically cross-linking a polyvinyl alcohol (PVA) in the presence of a cross-linking agent which polycondenses hydroxy groups. The most preferred product is obtained by cross-linking, in aqueous solution, a polyvinyl alcohol with a molecular weight which is in the range 30000 to 250000, with glutaraldehyde, the solution of polyvinyl alcohol and glutaraldehyde being acidified with vigorous stirring to obtain a micro-gel with a theoretical degree of cross-lining which is in the range 0.1% to 0.5% (i.e., in the range 0.001 moles to 0.005 moles of glutaraldehyde per mole of monomer unit). Such a product has remarkable fluid loss control properties but loses any effectiveness when used in the presence of certain other additives in current use, in particular dispersing agents based on polynaphthalene sulphonate. The dispersing agents which are recommended for use with this fluid loss control agent are polyrnelamine sulphonate type dispersing agents. However, under those conditions, the cement slurries formed usually tend to form free water, albeit in very small amounts (typically of the order of several milliliters measured under API conditions) but nevertheless judged to be too high for wells which are subject to gas migration problems.

SUMMARY OF THE INVENTION

The authors of the present invention have shown that, remarkably, it is possible to enlarge considerably the compatibility range of micro-gel type fluid loss control agents based on chemically cross-linked polyvinyl alcohol by the addition of an agent which can block any damaging interaction between the micro-gel and the dispersing agent.

The invention thus provides a fluid loss control agent for a cement slurry, comprising a surfactant and a micro-gel obtained by chemical cross-linking of a polyvinyl alcohol, by reacting the polyvinyl alcohol in solution with agents which can condense with at least two alcohol functions at a pH of less than 10, the molar concentration of the cross-linking agent with respect to the monomer units of the PVA being in the range about 0.1% to 0.5%.

The surfactant preferably contains polar groups which modify the electrostatic environment of the polyvinyl alcohol particles. Non ionic surfactants are preferred. The surfactant of the invention is preferably selected among the group consisting of polyvinylpyrrolidone, styryl phenol derivatives, N-alkyl pyrrolidones with an alkyl chain of less than 12, alkoxylated alcohols with an alkyl chain less or equal to 14 and water-soluble copolymers of vinyl pyrrolidone such as vinyl acetate with a vinyl acetate content of less than 50%.

The best results were obtained with a polyvinylpyrrolidone-type surfactant. With a C10–C12 alcoholate, the compatibility with polynaphthalenesulphonate type dispersing agents was also improved but without reducing the quantities of free water.

The surfactant/micro-gel weight ratio is generally in the range 0.5 to 1.5, typically of the order of 1, this ratio being calculated on the basis of the active mass of cross-linked polyvinyl alcohol.

The condensing agent used to synthesize the micro-gel is preferably selected from glyoxal, glutaraldehyde, maleic acid, oxalic acid, dimethylurea, polyacroleins, diisocyanates, divinylsulphate, and chlorides of diacids. Glutaraldehyde is particularly preferred. The micro-gel is typically prepared in aqueous solution comprising 2% to 5% (by weight), preferably on the order of 3.5% of cross-linked polyvinyl alcohol.

The fluid loss control agent of the invention is used in cement slurries in amounts of 0.5 to 2 gps (gallons per sack of cement) and is not only compatible with polymelamine sulphonate type dispersing agents but also with polynaphthalene sulphonate type dispersing agents, as well as with various other additives, in particular bentonite.

Using these dispersing agents and other additives, it is possible to obtain fluid losses of less than 40 ml, with free water volumes of less than 1 ml. Advantageously, these formulations are gas tight.

DESCRIPTION OF THE PREFERRED EMBODIMENT

In a particularly preferred embodiment of the invention, the surfactant is added to the micro-gel before its use but the two components can also be added independently on preparing the cement slurry.

Micro-gel synthesis

A commercial polyvinyl alcohol was used which had a degree of hydrolysis of about 88 mole % and a molecular weight of about 160000 (Ubbelohde viscosity determination). A dilute aqueous polyvinyl alcohol solution was prepared. The solution was heated to 80° C. for 24 hours, with stirring. The temperature was then reduced to about 50° C. for addition of a 25% glutaraldehyde solution. While continuing to stir vigorously, hydrochloric acid was added to obtain a pH of between 3 and 4. A micro-gel was obtained which had a theoretical degree of cross-linking of 0.27% (i.e., 0.0027 mole of glutaraldehyde per mole of monomer unit), in aqueous solution with 3.65% by weight of active cross-linked polymer mass.

EXAMPLE 1

Selection of surfactant

Cement slurries with a density of 1,89 g/cm³ were produced from the same batch of petroleum grade cement (G class Portland cement), systematically adding a liquid antifoamiing agent (polypropylene glycol) in an amount of 0.03 gps (American gallons per sack, i.e., 3.78 liters per 42 kilogram cement sack), 0.04 gps of a liquid retarding agent (licnosulfonate) intended for cementing at a temperature of less than 100° C., 0.05 gps of a polyrnelamine sulphonate (PMS) type or polynaphthalene sulphonate (PNS) type dispersing agent and 1.1gps of a fluid loss control agent, a 3.65% (by weight) solution based on chemically cross-linked polyvinyl alcohol to which an NPE type (nonylphenol ethoxylate), SPS (sodium polystyrene sulphonate) or PVP type (polyvinylpyrrolidone) surfactant had been added. For NPE, 0.1gps of surfactant was added to a formulation comprising 0.1 gps of X-PVA. For SPS and PVP, the fluid loss control agent—added in an amount of 1.1 gps—was comprised of a mixture of 99.7% of X-PVA and 0.3% of SPS and respectively 96.5% of X-PVA and 3.5% of PVP (percentages by weight), these three quantities corresponding to comparable quantities in terms of effectiveness.

Fluid losses (over 30 minutes) and quantities of free water were measured using the current API standard.

| Dispersing agent | Surfactant | Quantity | Fluid loss at 85° C. | Free water |
|---|---|---|---|---|
| PMS | none | | 45 ml | 1.5 ml |
| PNS | none | | 590 ml | |
| PNS | NPE | 0.1 gps | 550 ml | |
| PNS | SPE | 0.3% | 450 ml | |
| PNS | PVP | 3.5% | 36 ml | 0 ml |

It is very clear that the fluid loss control agent lost all effectiveness when the dispersing agent was PNS. Addition of an NPE or SPE type dispersing agent, without being totally without effect, did not produce performances obtained with PMS. In contrast, the initial effectiveness of the micro-gel was completely recovered and even substantially improved when a PVP type surfactant was added.

Further, free water formation disappeared. This disappearance, and a fluid loss level of less than 40 ml, led to the production of a slurry which was effectively impermeable to gas as was verified by different laboratory equipment used to measure gas migration through a cement.

EXAMPLE 2

Optimization of the X-PVA/surfactant ratio 20 slurries were prepared from the same basic formulation: petroleum grade cement (class G Portland cement, "Black Label" from Dickerhof), 0.03 gps of anti-foaming agent (D047), 0.04 gps of retarding agent (D081), and a sufficient quantity of water to obtain a slurry with a density of 1.89 g/cm³. X-PVA micro-gel was added, also polyvinylpyrrolidone PVP as the surfactant and polynaphthalene sulphonate as the dispersing agent. The micro-gel and the PVP were mixed for 15 minutes with stirring before being added to the cement slurry mixing water.

For each of the 20 formulations, the following were measured under API conditions and at 65.6° C. (150° F.): the rheology of the slurry (yield point or TY in Pascals and the plastic viscosity in milliPascals. second [centiPoises]), the gel strength after 10 minutes (in Pa), the fluid loss volume (in ml) over 30 minutes and the free water volume.

In order to guarantee good pumping conditions, the yield point should be close to at most a few Pascals, the plastic viscosity should be less than 40 cP and the gel strength after 10 mfinutes should be less than 20 Pa

| Test n° | 1 | 2 | 3 | 4 | 5 | 6 | 7 |
|---|---|---|---|---|---|---|---|
| X-PVA [gps] | 1 | 1 | 1 | 0.5 | 1 | 1.5 | 1 |
| PVP [gps] | 0.3 | 0.3 | 0.3 | 0.3 | 0.1 | 0.3 | 0.3 |
| PNS [gps] | 0.05 | 0.05 | 0.05 | 0.05 | 0.05 | 0.05 | 0.02 |
| TY (65,6° C.) | 1.47 | 2.05 | 1.83 | 1.54 | 2.03 | 2.26 | 41.95 |
| PV (65,6° C.) | 31.19 | 32.08 | 32.18 | 25.67 | 4.,42 | 38.07 | 46.9 |
| 10' Gel | 8 | 11 | 10 | 10 | 10 | 11 | 12 |
| Free water | 0 | 0 | 0 | 0 | 0 | 0 | 0 |
| Fluid loss at 65,6° C. | 30 | 36 | 48 | 64 | 86 | 40 | 24 |

| Test n° | 8 | 9 | 10 | 11 | 12 | 13 | 14 |
|---|---|---|---|---|---|---|---|
| X-PVA | 1 | 1 | 1.425 | 1 | 0.75 | 0.864 | 1.084 |
| PVP | 0.5 | 0.3 | 0.212 | 0.3 | 0.3 | 0.425 | 0.206 |
| PNS | 0.05 | 0.08 | 0.073 | 0.05 | 0.05 | 0.032 | 0.05 |
| TY (65,6° C.) | 2.48 | 0.86 | 1.27 | 1.71 | 1.32 | 52.02 | 1.81 |
| PV (65,6° C.) | 33.88 | 31.6 | 35.87 | 31.85 | 24.4 | 4.,9 | 31.42 |
| 10' Gel | 14 | 3 | 5 | 12 | 8 | 17 | 12 |
| Free water | 0 | 6 | 1.2 | trace | 0.05 | 0 | trace |
| Fluid loss at 65,6° C. | 40 | 84 | 52 | 34 | 52 | 36 | 54 |

| Test n° | 15 | 16 | 17 | 18 | 19 | 20 |
|---|---|---|---|---|---|---|
| X-PVA | 1 | 0.588 | 1.084 | 1.006 | 1.5 | 1.084 |
| PVP | 0.3 | 0.377 | 0.347 | 0.142 | 0.3 | 0.347 |
| PNS | 0.05 | 0.061 | 0.038 | 0.037 | 0.05 | 0.06 |
| TY (65,6° C.) | 1.72 | 1.76 | 45.78 | 3.57 | 1.71 | 1.81 |
| PV (65,6° C.) | 33.54 | 28.59 | 40.1 | 35.55 | 31.85 | 34.43 |
| 10' Gel | 10 | 9 | 17 | 15 | 11 | 11 |
| Free water | 0 | trace | trace | 0 | 0 | not measured |
| fluid loss at 65,6° C. | 28 | 48 | 30 | 30 | 38 | 58 |

Formulations 1, 2, 6, 8, 11, 15, 16, 18 and 19 exhibited very good rheology, very low fluid loss and excellent stability. Good results were also obtained when the quantity of surfactant exceeded about 1.5% by weight (see Example 18). It should be noted, however, that this example only contained a relatively small quantity of dispersing agent, which in the particular case of Black Label cement from Dickerhof does not cause any problems as the cement is very easy to disperse. With other cements, the amount of dispersing agent is more generally of the order of 0.05 gps, in which case it is preferable that the PVP surfactant is added in an amount of at least 3% (percentages by weight with respect to the weight of cross-linked polyvinyl alcohol), more preferably at least 3.5%. Higher contents would not provide any supplemental gain and are thus not recommended.

EXAMPLE 3

Compatibility with calcium chloride

As in the preceding examples, slurries were prepared with a density of 1,89 g/cm³ from a class G Portland cement, by adding 0.05 gps of anti-foaming agent D047, 0.035 gps of PNS or PMS type dispersing agent, 1% (by weight of cement) of calcium chloride $CaCl_2$, calcium chloride being the most frequently used cement-setting accelerator, and 0.8 gps of fluid loss control agent.

| Dispersing agent | Fluid loss control agent | Fluid loss at 29,6° C. | Free water |
|---|---|---|---|
| PNS | X-PVA | 480 ml | 0.2 ml |
| PMS | X-PVA | 26 ml | 1 ml |
| PNS | 96,5% X-PVA + 3,5% PVP | 24 ml | 0.2 ml |

It can be seen that the fluid loss control agent of the invention was perfectly compatible with calcium chloride, added in the presence of PNS, and the fluid loss control was as good when PMS was used as the dispersing agent with, in addition, a substantial reduction in the free water. The formulation with the surfactant of the invention was effectively gas tight.

EXAMPLE 4

Compatibility with bentonite

Slurries with a density of 1.55 g/cm³ were prepared from a class G Portland cement by adding 0.03 gps of anti-foaming agent D047, 0.05 gps of dispersing agent, 0.05 gps of cement setting retarding agent D081 and 2% (by weight of cement) of pre-hydrated bentonite. The bentonite was principally used to make the cement slurry lighter.

| Dispersing agent | Fluid loss control agent | Quantity | Fluid loss at 29,6° C. | Gas tight |
|---|---|---|---|---|
| PMS | 96,5% X-PVA + 3,5% PVP | 1.5 gps | 38 ml | yes |
| PMS | 96,5% X-PVA + 3,5% PVP | 1 gps | 64 ml | no |
| PNS | 96,5% X-PVA + 3,5% PVP | 1.5 gps | 200 ml | yes |
| PMS | X-PVA | 1.6 gps | 446 ml | no |
| PMS | X-PVA | 2.4 gps | 281 ml | no |
| PNS | 96,5% X-PVA + 3,5% SPS | 2.4 gps | 600 ml | no |

It can be seen that the fluid loss control agent of the invention was compatible with bentonite when a polymelamine sulphonate type dispersing agent was used and that gas tight compositions could be obtained. Without polyvinylpyrrolidone, it was impossible to obtain fluid losses of less than 100 ml, even when the quantity of fluid loss control agent was raised to 2.4 gps. When polyvinylpyrrolidone was replaced by sodium polystyrene sulphonate, substantial degradation of the results was observed.

What is claimed is:

1. A fluid loss control agent in a cement slurry, comprising a micro-gel obtained by chemical cross-linking of a polyvinyl alcohol, said cross-linking performed by reacting the polyvinyl alcohol in solution with agents which can condense with at least two alcohol functional groups at a pH of less than 10, the molar concentration of the cross-linking agent with respect to the monomer units of the polyvinylalcohol being in the range about 0.1% to 0.5%, characterized in that it further comprises a surfactant selected from among the group consisting of polyvinylpyrrolidone, N-alkyl pyrrolidones, with an alkyl chain of less than 12, alkoxylated alcohols, with an alkyl chain less or equal to 14, and water soluble copolymers of vinyl pyrrolidone.

2. A cement composition comprising cement, water, and a fluid loss control agent in a cement slurry, wherein said agent comprises a microgel obtained by chemical crosslinking of a polyvinyl alcohol, said cross-linking performed by reacting the polyvinyl alcohol in solution with agents which can condense with at least two alcohol functional groups at a pH of less than 10, the molar concentration of the crosslinking agent with respect to the monomer units of the polyvinyl alcohol being in the range about 0.1% to 0.5%, and further comprising a surfactant selected from among the group consisting of polyvinylpyrrolidone, N-alkyl pyrrolidones, with an alkyl chain of less than 12, alkoxylated alcohols, with an alkyl chain less or equal to 14, and water soluble copolymers of vinyl pyrrolidone.

3. The cement composition of claim 2 further comprising at least one additive selected from the group consisting of polymelamine sulphonate, polynaphthalene sulphonate, and bentonite.

4. The fluid loss control agent of claim 2 wherein said surfactant is a polyvinylpyrrolidone.

5. The fluid loss control agent according to claim 2 wherein said condensing agent is selected from the group consisting of glyoxal, glutaraldehyde, maleic acid, oxalic acid, dimethylurea, polyacroleins, diisocyanates, divinylsulphate, and chlorides of diacids.

6. The fluid loss control agent of claim 2 in which the surfactant/active mass of micro-gel weight ratio is in the range 0.5 to 1.5.

7. The fluid loss control agent of claim 4, characterized in that the surfactant/active mass of micro-gel weight ratio is in the range 0.5 to 1.5.

8. The fluid loss control agent of claim 5, characterized in that the surfactant/active mass of micro-gel weight ratio is in the range 0.5 to 1.5.

9. The fluid loss control agent of claim 6 wherein said surfactant/micro-gel weight ratio is about 1.

10. A cementing composition according to claim 2, wherein said fluid loss control agent is added to said cement slurry in an amount of 0.5 gps to 2 gps.

* * * * *